(12) United States Patent
Ati et al.

(10) Patent No.: US 6,658,193 B1
(45) Date of Patent: Dec. 2, 2003

(54) FIBER MANAGEMENT BRACKET

(75) Inventors: Babi Ati, Rohnert Park, CA (US); Dean Falkenberg, Windsor, CA (US)

(73) Assignee: Cisco Technology, Inc., San Jose, CA (US)

( * ) Notice: Subject to any disclaimer, the term of this patent is extended or adjusted under 35 U.S.C. 154(b) by 41 days.

(21) Appl. No.: 10/002,500

(22) Filed: Nov. 2, 2001

(51) Int. Cl.[7] .................................................. G02B 6/00
(52) U.S. Cl. ........................ 385/136; 385/134; 385/137
(58) Field of Search ................................. 385/134–138

(56) References Cited

U.S. PATENT DOCUMENTS

| | | | | |
|---|---|---|---|---|
| 5,067,678 A | * | 11/1991 | Henneberger et al. ..... 248/68.1 |
| 5,710,855 A | * | 1/1998 | Konwitz ...................... 385/135 |
| 5,724,469 A | * | 3/1998 | Orlando ....................... 385/135 |
| 5,946,440 A | * | 8/1999 | Puetz ........................... 385/135 |
| 6,330,389 B1 | * | 12/2001 | Daoud et al. ................ 385/135 |
| 6,381,393 B1 | * | 4/2002 | Matthews et al. ........... 385/134 |
| 6,396,989 B1 | * | 5/2002 | Johnston et al. ............ 385/134 |
| 6,466,725 B2 | * | 10/2002 | Battey et al. ................ 385/135 |
| 2002/0131751 A1 | * | 9/2002 | Zdinak et al. ............... 385/136 |

* cited by examiner

*Primary Examiner*—Edward J. Glick
*Assistant Examiner*—Thomas R Artman
(74) *Attorney, Agent, or Firm*—Campbell Stephenson Ascolese LLP

(57) ABSTRACT

A relatively U-shaped cable management bracket comprises a body and at least one latch bar. An edge of the bracket is further shaped to form two U-shaped receptacles. In alternative embodiments, either one latch bar traverses both receptacles in order to route and restrain cables, or each receptacle is traversed by a separate latch bar.

17 Claims, 10 Drawing Sheets

FIBER MANAGEMENT BRACKET

BACKGROUND OF THE INVENTION

1. Field of the Invention

The present invention relates to fiber optic telecommunications equipment and, in particular, to a bracket that is configured to route and store cables.

2. Description of the Related Art

In the telecommunications and data transmission industries, optical fibers, rather than metal cables, are increasingly used to transmit signals. The technology uses glass or plastic threads (fibers) to transmit data. A fiber optic cable consists of a bundle of threads, each of which is capable of transmitting messages modulated into light waves. Technologies that transmit data over metal cables, rather than fiber optic cables, transmit data in analog form. Fiber optic technology allows data to be transmitted digitally rather than analogically. Fiber optic data transmissions, being digital, are in the natural form for computer-related data.

Optical cable management has become a major concern in the design of telecommunications equipment. Fiber optic cable typically includes at least one glass core for optical, high bandwidth transmission of information. Typically, fiber optic cable requires a minimum bending radius (e.g., a one-inch bending radius) to avoid damaging the glass core and to avoid producing a large dB loss in the transmission of information through the cable. Therefore, optical cabling must be handled and stored carefully to avoid tight bends and kinks in the cabling.

The use of optical fibers to transmit data in the telecommunications industry has grown dramatically in recent years. Newer systems require increasingly large numbers of cables to be efficiently housed in a relatively small space. The cables may include various types of cables such as fiber optic, coaxial, and power cables.

Provision for high-density fiber optic systems has become more necessary as the use of fiber optic cables in the telecommunications industry has increased. By density, it is meant the number of locations per unit volume or unit area for providing connections between fiber optic cables on the chassis. One problem associated with high-density cable management systems is the need to avoid bending of the fiber optic cables in excess of their minimum bending radius. In addition, the high density creates a need for an organizational system that segregates the cables according to their category (i.e., fiber, coaxial, power, etc.).

SUMMARY OF THE INVENTION

A cable management bracket comprises a body and a latch bar. The body has a first surface and a second surface. The first surface, which in at least one embodiment corresponds to an outer surface of the bracket, is shaped to form a relatively U-shaped aspect, having parallel first and second edges with a third, perpendicular, edge between them. The second surface, which in at least one embodiment corresponds to an inner surface, is shaped to form two U-shaped receptacles. Each receptacle has a first and second wall, parallel to each other. The first and second walls of each receptacle are perpendicular to a center wall situated between them. The center wall of each aperture is parallel to the third edge of the first (outer) surface of the bracket. At least one of the first walls of the receptacles is shaped to include a latch aperture at its terminating edge. At least one of the second walls of the receptacles is shaped to include a hinge aperture at its terminating edge.

BRIEF DESCRIPTION OF THE DRAWINGS

The present invention may be better understood, and its numerous objects, features, and advantages made apparent to those skilled in the art by referencing the accompanying drawings.

FIG. 5, which includes

DETAILED DESCRIPTION

The following sets forth a detailed description of a mode for carrying out the invention. The description is intended to be illustrative of the invention and should not be taken to be limiting.

While particular embodiments of the present invention have been shown and described, it will be recognized to those skilled in the art that, based upon the teachings herein, further changes and modifications may be made without departing from this invention and its broader aspects and, thus, the appended claims are to encompass within their scope all such changes and modifications as are within the true spirit and scope of the invention.

Figure 1:
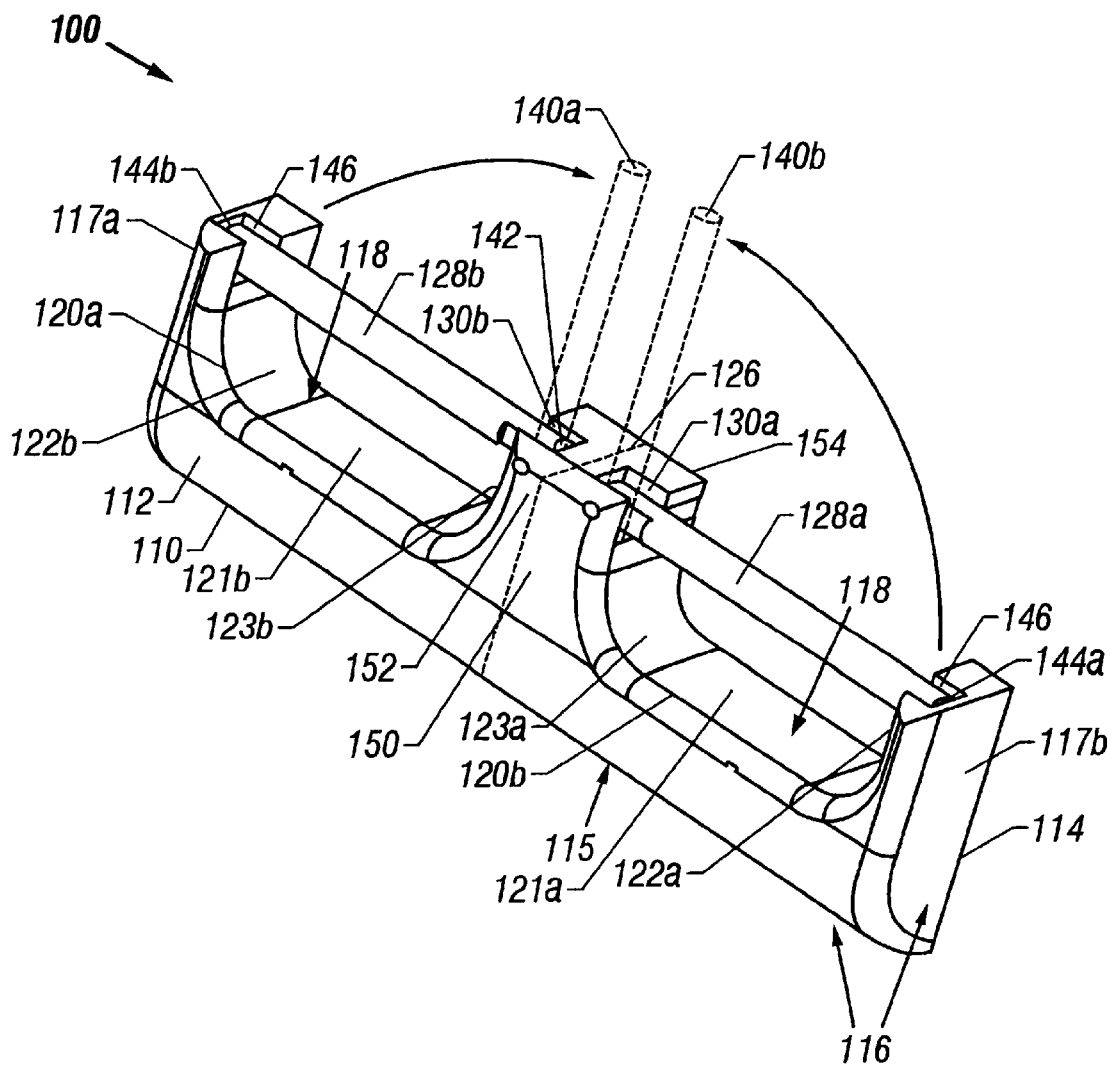
FIG. 1 is a plan view of a cable management bracket.

FIGS. 1 illustrates a cable management bracket 100 that allows fiber and other cables to be efficiently routed and restrained while preventing kinking and also while maintaining at least the minimum bend radius for fiber optic cables. The cable management bracket 100 also allows various types of cables to be separated according to their type (fiber optic, coaxial, power, etc.). The cable management bracket 100 includes a body 110. The bracket 100 includes a front surface 112 and a back surface 114. The bracket 100 also includes an outer surface 116 and an inner surface 118. In at least one embodiment, the body 110 is formed from a plastic material, the plastic being a blend of polycarbonate (PC) and acrylonitrile butadiene styerene (ABS) plastic.

The outer surface 116 of the bracket 100 forms a relatively U-shaped aspect. The outer surface 116 includes first and second edges 117a, 117b that are parallel to each other and form the upright outer edges of the U-shaped bracket 100. A third edge 115 of the outer surface 116 is situated between the upright outer edges 117a, 117b. Being perpendicular to the first and second upright outer edges 117a, 117b, the third edge 115 forms the base edge of the U-shaped bracket 100.

In at least one embodiment, the body 110 is five inches in length and is intended for use on any telecommunications chassis 600 that conforms to a three-rack-unit (3RU) form factor known in the art. As such, in at least one embodiment, the body 110 is shaped in order to provide conforming contact alignment against a telecommunications chassis 600. In an embodiment shaped to be placed into lengthwise contact with a 3RU telecommunications chassis such as the chassis 600 depicted in FIG. 6, the body 110 is substantially planar.

Figure 2:
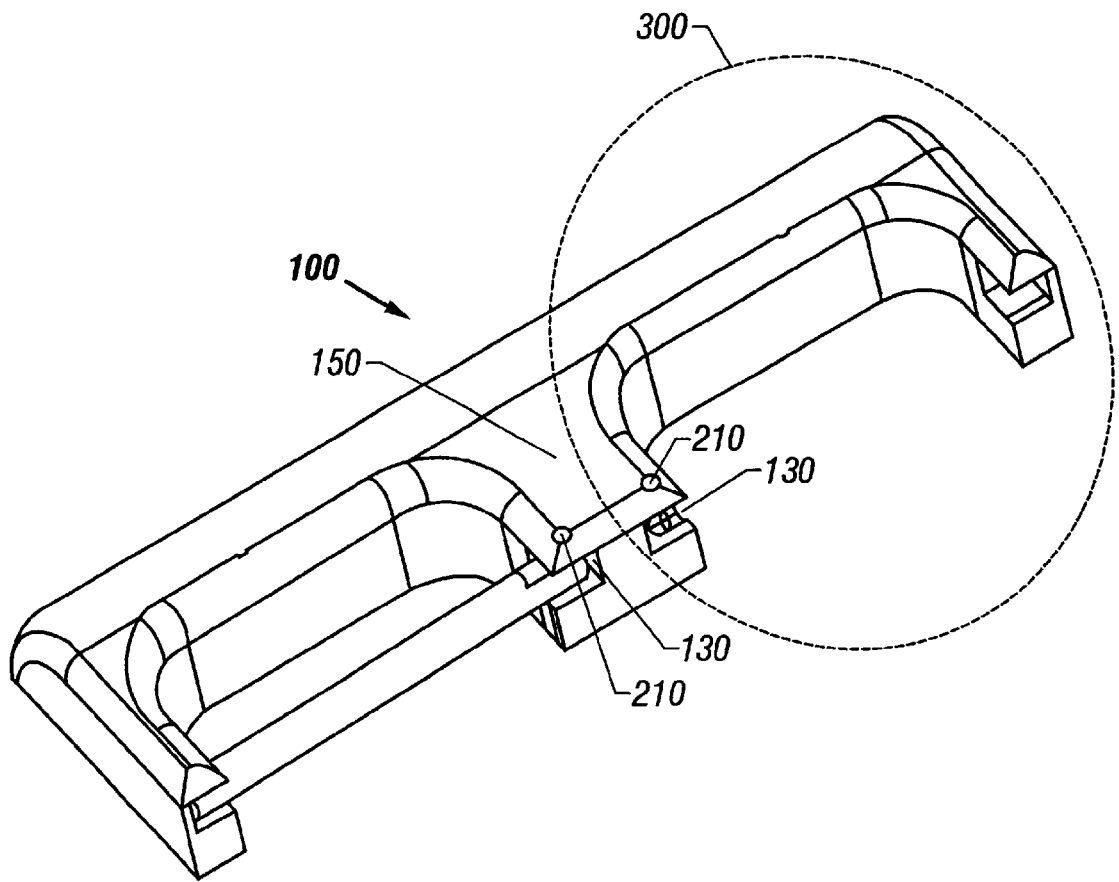
FIG. 2 is a plan view of a cable management bracket.
Figure 3:
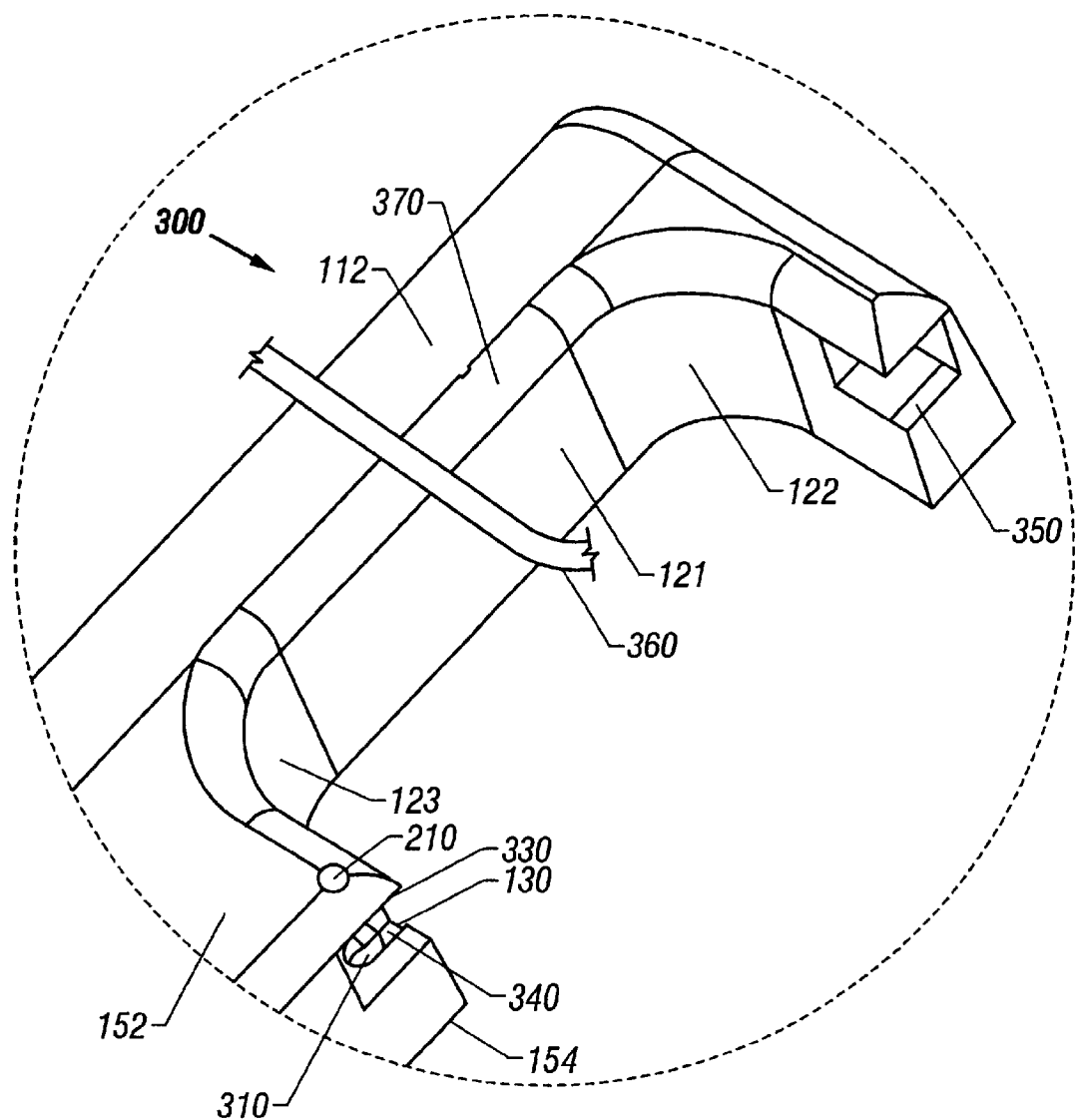
FIG. 3 is an expanded plan view of a portion of a cable management bracket that includes a cable receptacle.

FIGS. 1, 2, and 3 illustrate that the inner surface 118 of the bracket 100 is shaped to form two U-shaped receptacles 120a, 120b. In at least one embodiment, the receptacles 120a, 120b are intended to allow cables to be routed through the cable management bracket 100. Each U-shaped receptacle 120 is shaped to form a first wall 122 and a second wall 123, the walls being integral with a center wall 121 therebetween. The receptacles are formed to be symmetrical with each other in relation to the midline 126 of the body 110. This allows for ease of operation in that the latch members 128, discussed below, each swing toward the centerline 126 when unlatched, allowing cables to be easily slipped into the receptacles 120a, 120b from the top or bottom, respectively, of the cable management bracket 100 when the bracket is mounted in a vertical position.

The second wall 123 of each receptacle 120 is formed, in at least one embodiment, closer to the midline 126 of the bracket 100 than the first wall 122. The second wall 123 is formed to include a hinge aperture 130 at its terminating edge. The hinge aperture 130 is shaped and sized to receive a first end 142 of a latch bar member 128.

The first wall 122 of each receptacle 120 is shaped to form a latch aperture 146 at its terminating end. The latch aperture 146 is shaped and sized to receive the second end 144 (FIG. 4) of the latch bar member 128. The second walls 123 of each receptacle 120 are separated by a center member 150 formed therebetween. The midline 126 of the bracket 100 runs through the center of the center member 150. The center member 150 has a first surface 152 and a second surface 154.

Figure 4:
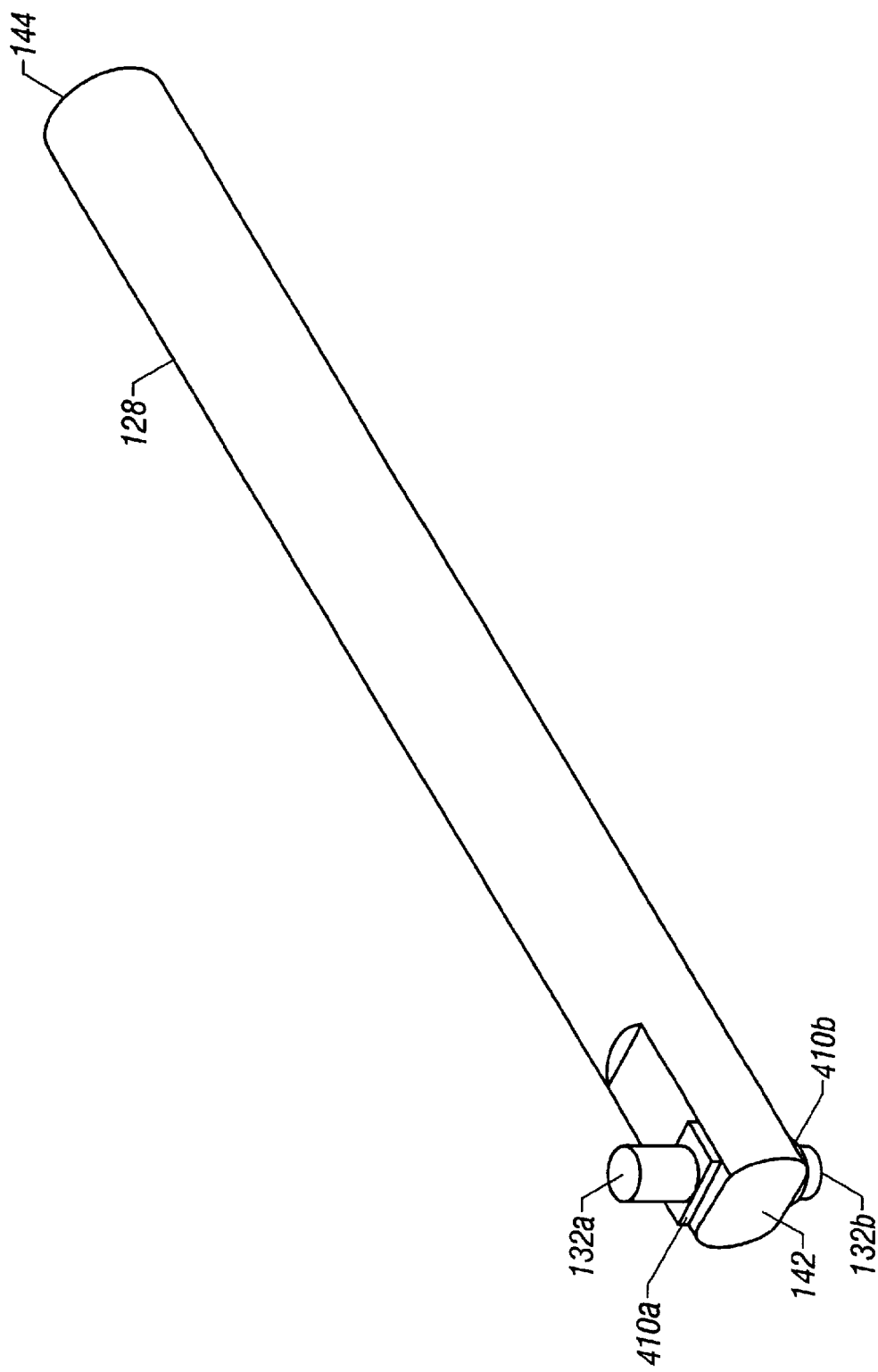
FIG. 4 is a plan view of a latch bar member.

FIG. 4 illustrates a latch bar member 128. The latch bar member 128 is a cylindrical bar sized and shaped to traverse the U-shaped receptacle 120 such that it forms a barrier means for securing cables within the receptacle 120. The latch bar member 128 includes a pair of locking pins 132a, 132b. The latch bar member 128 further includes a pair of formations 410a, 410b that act as washers and help facilitate the hinge-like opening action of the latch bar member 128 when it is installed within the cable management bracket 100.

While the latch bar member 128 is a cylindrical-shaped bar in the preferred embodiment, the latch bar member 128 can be any shape of bar such as a flat rectangular bar, prism-shaped bar, semicircular bar, or any other conveniently-shaped bar that is relatively long and narrow and having a first end 142 and second end 144. The first end 142 of the latch bar member 128 is secured within the hinge aperture 130 by a securing means such as a locking pin 132. FIG. 4 illustrates that, in the preferred embodiment, the latch pins 132 are formed to be integral with the latch bar member 128.

FIGS. 2, 3, and 4 illustrate that the locking pins 132a, 132b serve as a means for securing the latch bar member 128 within the hinge aperture 130. In a preferred embodiment, the locking pins 132a, 132b are symmetrical with relation to each other and are disposed on opposing sides near a first end 142 of the latch bar member 128. A pin hole 210 is configured to receive one locking pin 132a associated with a latch bar member 128. The pin hole 210 is an aperture formed in the first surface 152 of the center member 150 and proceeding through a first inner wall 330 of the hinge aperture 130. In a preferred embodiment, the pin hole 210 is shaped to engage a first of the locking pins 132a so that the first locking pin 132a fits snugly therein, but with sufficient clearance to allow hinge-type rotating movement of the first locking pin 132a within the pin hole 210.

The other locking pin 132b fits into an aperture 310 that is disposed on a second inner wall 340 of the hinge aperture 130 opposing the pin hole 210. The aperture 310 is formed within the hinge aperture 130 to be of a size and shape, in relation to the locking pin 132b, to keep the pin 132b from excessive movement, keeping the locking pin 132b engaged within the hinge aperture 130 but also allowing sufficient clearance to allow hinge-type rotating movement of the locking pin 132b within the aperture 310.

The second end 144 of the latch bar member 128 fits into a friction fit latch aperture 146 (FIG. 1). The aperture 146 is shaped to include an elevated ridge 350 that prevents the latch bar member 128 from inadvertently moving out of place once it has been closed into the latch aperture 310. In order to achieve a friction fit of the second end 144 of the latch bar member 128, the latch aperture 310 is appropriately sized and shaped to closely fit the dimensions of the second end 144. This latching feature allows cables to be securely installed within the bracket 100, and removed from within the bracket 100, easily and quickly.

Figure 5A:
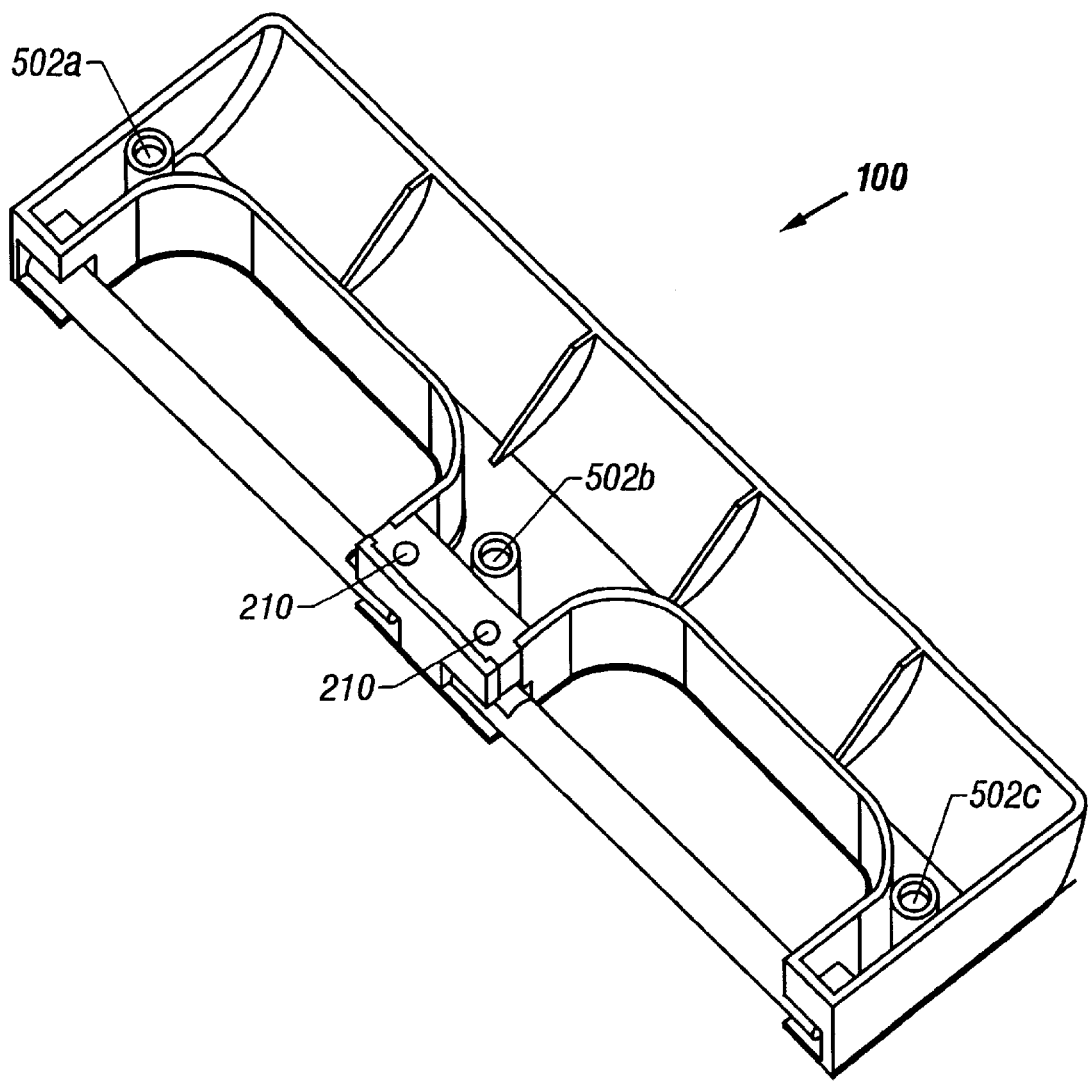
FIGS. 5A and 5B, is a cross-sectional view of a cable management bracket.
Figure 5B:
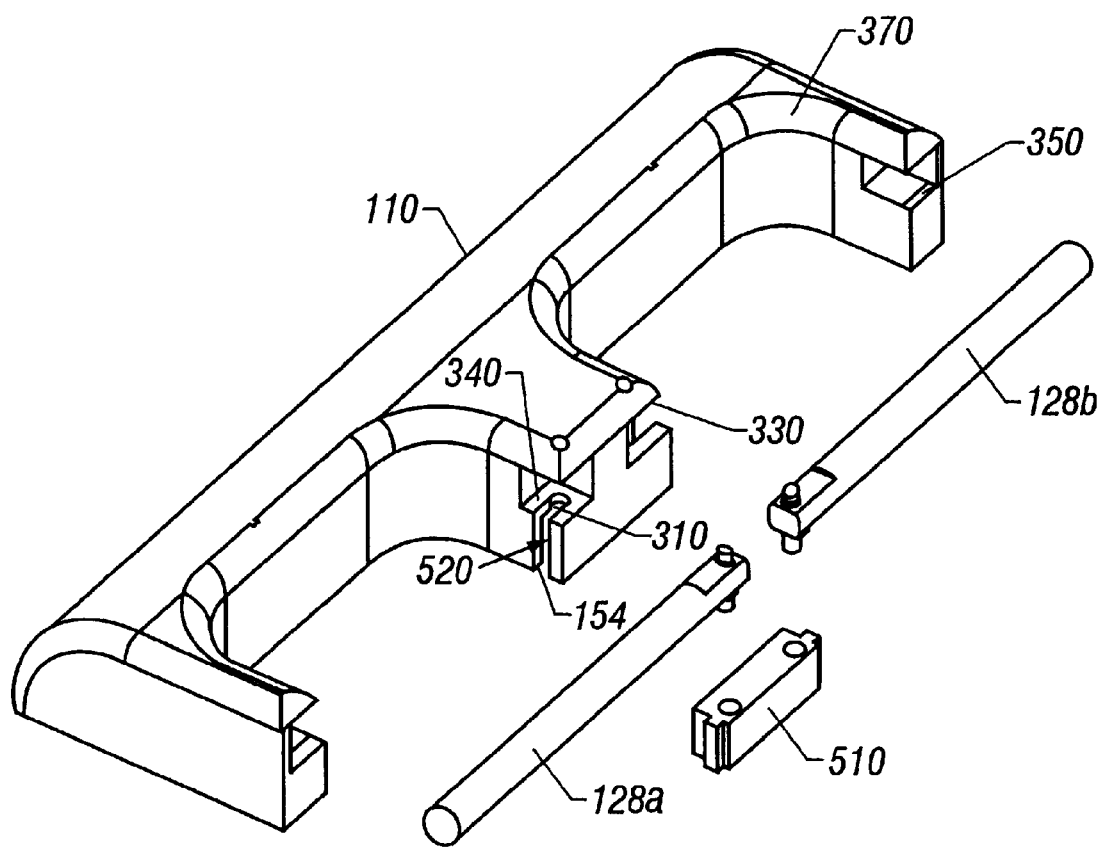

FIG. 5B illustrates an additional mechanism 510 for keeping the latch bar members 128a, 128b in place. A stabilizing member 510 is used, in at least one embodiment, to prevent the latch bar members 128a, 128b from becoming dislodged from the body 110 in the event of excessive rotational force or vibration. The stabilizing member 510 is placed within a hollow opening formed into the second side 154 of the body 110. The stabilizing member 510 sized and shaped to be held into place by friction within the hollow opening (shown as reference numeral 520 as seen through the opening provided by the hinge aperture 130). One skilled in the art will recognize that the additional stabilization provided by the stabilizing member 510 is purely optional, and that the stabilizing member 510 can be eliminated from the cable management bracket 100 without departing from the invention.

Figure 6:
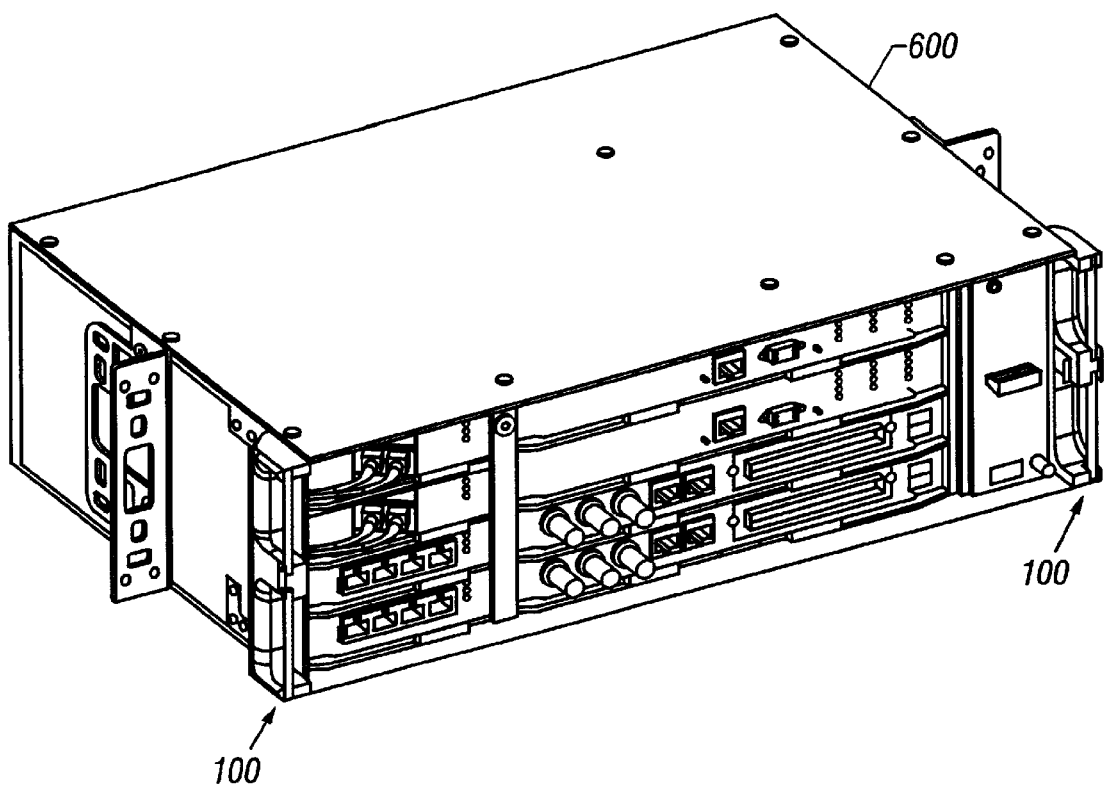
FIG. 6 is a plan view of a telecommunications chassis that includes two installed cable management brackets.

FIGS. 5, including 5A and 5B, and 6 illustrate installation of the cable management bracket 100 on a telecommunications chassis 600. FIG. 5 is a cross-sectional view of the cable management bracket 100. The cable management bracket 100 is made, in a preferred embodiment, of a plastic blend that is relatively inexpensive to manufacture. FIG. 5 illustrates that the entire bracket 100 can be easily installed onto a telecommunications chassis 600 via three pre-formed apertures 502 formed through the body of the cable management bracket 100. By placing a securing mechanism, such as a rivet, pin, bolt, or screw through the pre-formed aperture 502 and into the body of the chassis 600, the bracket 100 can be secured to the chassis 600. In a preferred embodiment, the securing mechanism is a thread-forming plastic screw. FIG. 6 illustrates that the symmetrical nature of the cable management bracket 100 leads to an efficient universality in that the cable management bracket 100 can be mounted on either the left side or right side of a telecommunications chassis 600 in a vertical alignment while preserving the same functionality. This efficiently facilitates only one production process for brackets 100 capable of being installed on either side of a chassis 600. (One skilled in the art will recognize that left- and right-mounted brackets will be "upside-down" in relation to each other but have identical functionality).

Figure 7:
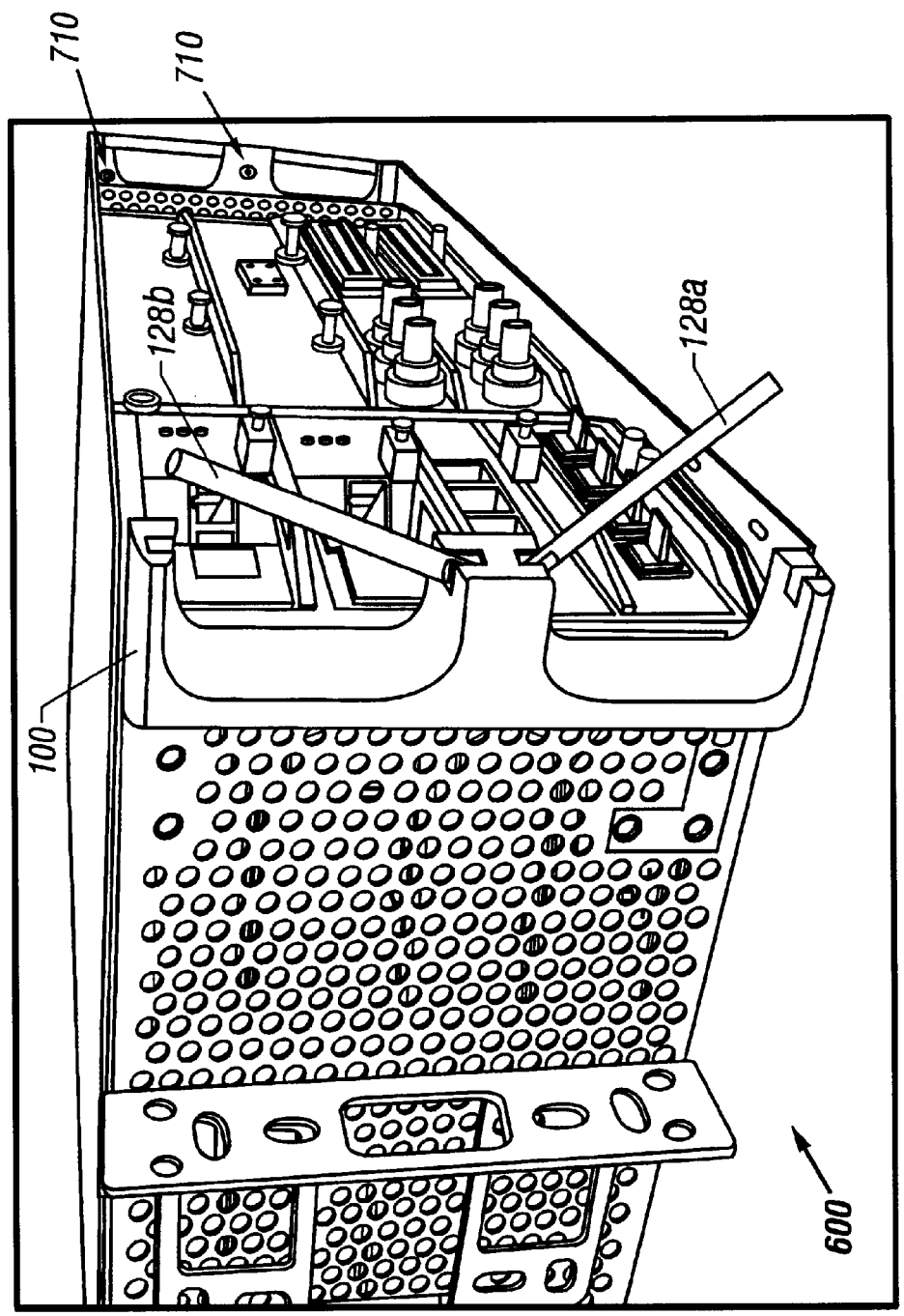
FIG. 7 is a side view illustrating an installed cable management bracket having its latch bar members in an open position.

FIG. 7 illustrates the operation of the latch bar members 128 when the cable management bracket 100 is installed vertically on a telecommunications chassis 600. FIG. 7 illustrates that the latch bar members 128 are releasable, with each latch bar member 128 swinging away from the body 110 of the bracket 100 on a vertical axis when moved to an open position. FIG. 7 also illustrates two of the three securing mechanisms 710, such as screws, used to secure the bracket 100 to the chassis 600 via pre-formed apertures 502 (FIG. 5A).

Figure 8:
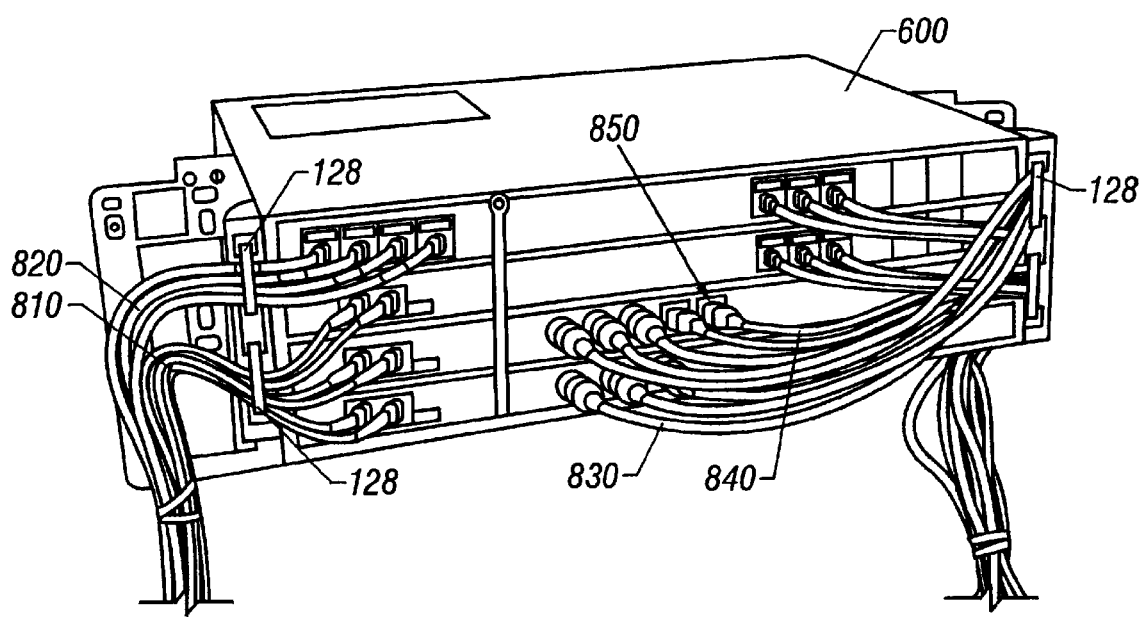
FIG. 8 is a front view illustrating two installed cable management brackets having cables routed through and restrained within the cable receptacles.

FIGS. 1 and 8 illustrate how the cable management bracket 100 operates to restrain cables. In at least one embodiment, a cable management bracket 100 is installed on each side of a telecommunications chassis 600. Each bracket 100 is capable of restraining multiple cables 810, 820, 830, 840. In at least one embodiment, a different type of cable 820, 810, respectively, is routed through the upper receptacle 120a and the lower receptacle 120b. This allows cables to be segregated by type (such as power, fiber, coaxial, etc.). Also, this two-receptacle configuration allows that fewer numbers of cables need be dealt with when trying to add or remove cables from the receptacles. That is, all the cables in the lower receptacle 120b can remain undisturbed if a cable needs to be added to the upper receptacle 120a. When a cable needs to be added to the bracket 100, a user opens the appropriate releasable latch bar member 128 by moving the latch bar member 128 into an open position (such as that illustrated in FIG. 7). A cable 810, 820, 830, 840 is routed through the receptacle 120a, 120b and the releasable latch bar member 128 is then closed by moving it back into the closed position as illustrated in FIG. 8. The same procedure can be repeated with a different type of cable in a different one of the receptacles if the cable-segregation feature of the cable management bracket 100 is to be utilized.

When the latch bar member 128 is moved to its closed position, a squeeze factor is often introduced that pushes the cables into contact with each other and into contact with the walls 121, 122, 123 of the receptacle 120, thereby providing support for the cabling 810, 820, 830, 840. This support is advantageous because lack of support for cables 810, 820, 830, 840 is undesirable. When vibration occurs, such as that incident to moving or shipping a telecommunications system or vibration incident to seismic activity, the weight of an unsupported cable pulling against the connector 850 can unseat the connector 850. In addition, excessive vibration can damage the fragile glass fibers within the cables 810, 820, 830, 840.

FIG. 8 further illustrates an advantageous feature of the cable management bracket 100. The bracket 100 provides for cables 810, 820, 830, 840 to be stored within the bracket 100 while preserving the minimum bend radius required for fiber optic cables.

Returning to FIGS. 1 through 3, one can see that the minimum bend radius of any cable 360 restrained in the bracket 100 is preserved due to a beveled edge 370 between the front surface 112 of the body 110 and the U-shaped receptacle 120 formed by the first wall 122, second wall 123, and the center wall 121 therebetween. The size and curvature of the beveled edge 370 ensures that, when a cable 360 is placed into conforming contact with the edge 370, that the cable 360 is forced to maintain its minimum bend radius.

The foregoing discussion describes a cable management bracket 100 that is easy to manufacture. The components of the bracket 100 are manufactured, in at least one embodiment, to be easily assembled with each other without the use of tools or hardware such as screws or nuts. The bracket possesses universality in that it may be mounted on either side of a chassis 600 while maintaining identical functionality. The bracket 100 is shaped with a beveled edge 370 in order to maintain minimum bend radius requirements for fiber optic cables. The bracket 100 may be used, alternatively, to route and restrain a single type of cable or multiple types of cables. If segregation of various cable types is desired, each different cable type may be restrained within a different one of the cable receptacles 120.

Alternative Embodiments

Figure 9:
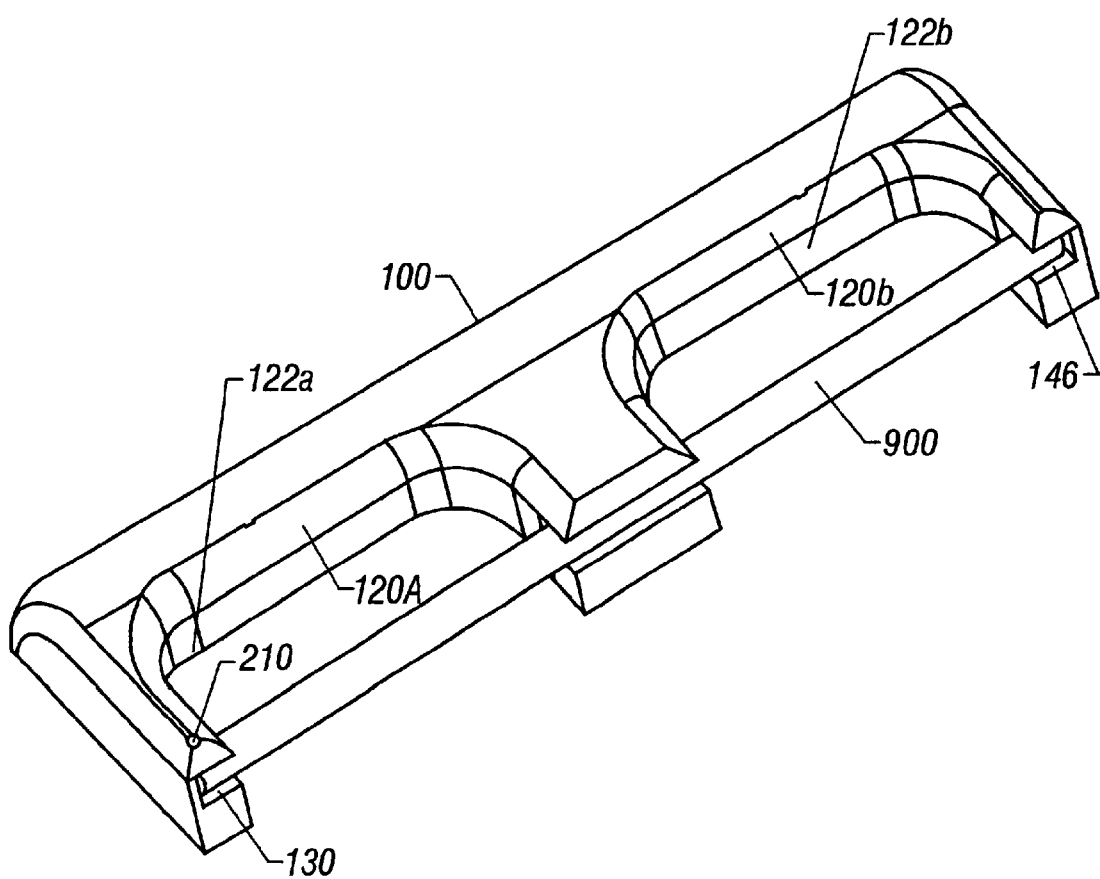
FIG. 9 is a plan view of a cable management bracket having a single latch bar member.

While the preferred embodiment shows two latch bar members 128a, 128b, one skilled in the art will recognize that similar functionality can be achieved with a single latch bar member 900 (FIG. 9) that traverses both receptacles 120a, 120b. In such embodiment, the first wall 122a of one of the receptacles 120a is formed to include a hinge aperture 130 at its terminating edge while the first wall 122b of the other receptacle 120b is shaped to form a latch aperture 146 at its terminating end. FIG. 9 illustrates such an embodiment.

One skilled in the art will recognize that the securing means 132 can be any mechanism that secures the latch bar member 128 within the aperture 130 while still allowing the latch bar member 128 to swing outward to an open position 140. Such securing means 132 include a rivet, pin, or screw that is placed through apertures in the first and second surfaces 152, 154 of the center member 150, as well as through an aperture through the latch bar member 128, thereby securing the latch bar member 128 within the hinge aperture 130 with a hinge-like functionality.

What is claimed is:

1. A cable management bracket, comprising:

a body having, a first surface and a second surface; and a latch bar;

wherein the second surface is shaped to form a first receptacle and a second receptacle, wherein each of the first and second receptacles form a relatively U-shaped aspect;

wherein each of the first and second receptacles is shaped to form a first wall and a second wall, the first and second walls being substantially parallel in relation to each other;

wherein an edge of the first and second receptacles has a curvature equal to at least the minimum bend radius of a cable managed by said cable management bracket;

wherein at least one of the first walls is shaped to include a latch aperture at its terminating edge; and wherein at least one of the second walls is shaped to include a hinge aperture at its terminating edge.

2. The cable management bracket recited in claim 1, wherein:

the first surface is shaped to form a relatively U-shaped aspect, the first surface having a first edge and a second edge, wherein the first edge and the second edge are substantially parallel to each other; and the first surface further includes a third edge, the third edge being disposed between the first edge and the second edge, the third edge being substantially perpendicular to the first and second edges.

3. The cable management bracket recited in claim 2 wherein:

each of the first wall and second wall is integral with, and perpendicular to, a center wall situated therebetween; and each of the center walls is parallel to the third edge.

4. The cable management bracket recited in claim 1, further comprising:

a second latch bar;

wherein each of the second walls is shaped to include a hinge aperture at its terminating edge; and wherein each of the first walls is shaped to include a latch aperture at its terminating edge.

5. The cable management bracket recited in claim 1, wherein:

the body is formed from plastic.

6. The cable management bracket recited in claim 5, wherein:

the plastic comprises a blend of polycarbonate plastic and acrylonitrile butadiene styrene plastic.

7. The cable management bracket recited in claim 1, further comprising:

a center member defined by the second walls of the first and second receptacles and a third wall perpendicular to the second walls.

8. The cable management bracket recited in claim 1, wherein:

the first and second receptacles are symmetrical with each other in relation to the midline of the body.

9. The cable management bracket recited in claim 3, wherein:

the third edge is planar; and each of the center walls is planar.

10. The cable management bracket recited in claim 1, wherein:

the latch bar is secured within the hinge aperture via a securing mechanism.

11. The cable management bracket recited in claim 10, wherein:

the securing mechanism comprises a locking pin.

12. A method for restraining cable in a fiber optic management bracket, comprising:

providing a cable management bracket, wherein the cable management bracket further comprises a releasable latch bar and a first receptacle;

opening the releasable latch bar to an open position;

routing a first cable through the first receptacle;

closing the releasable latch bar, thereby restraining the cable within the cable management bracket; and routing the first cable around an edge of the first receptacle, wherein the edge has a curvature equal to at least the minimum bend radius of the first cable.

13. The method recited in claim 12, further comprising:

routing a second cable through a second receptacle;

wherein the cable management bracket includes the second receptacle.

14. The method recited in claim 13, further comprising:

opening a second releasable latch bar to an open position in order to route the second cable through the second receptacle; and closing the second releasable latch bar, thereby restraining the second cable within the cable management bracket.

15. The method recited in claim 12, wherein:

opening the releasable latch bar to an open position further comprises opening the releasable latch bar such that is swings away from the body along a vertical axis.

16. The method recited in claim 14, wherein:

opening the releasable latch bar to an open position further comprises opening the releasable latch bar such that is swings away from the body along a vertical axis.

17. A cable management bracket, comprising:

means for receiving a first cable;

means for receiving a second cable;

means for securing the first cable within the means for receiving the first cable, the means for securing the first cable further comprises means for providing hinge-like opening action;

means for securing the second cable within the means for receiving the second cable, the means for securing the second cable further comprises means for providing hinge-like opening action;

releasable means for latching the means for securing the first cable;

releasable means for latching the means for securing the second cable; and means for ensuring a cable placed across an edge of said cable management bracket maintains a minimum bend radius.

* * * * *